Feb. 26, 1963 F. M. THOMAS 3,078,559

METHOD FOR PREPARING SEMICONDUCTOR ELEMENTS

Filed April 13, 1959 2 Sheets-Sheet 1

*INVENTOR.*
FRANK M. THOMAS
*BY*
Elmer J. Nealon
ATTORNEY.

Feb. 26, 1963 F. M. THOMAS 3,078,559

METHOD FOR PREPARING SEMICONDUCTOR ELEMENTS

Filed April 13, 1959 2 Sheets-Sheet 2

INVENTOR.
FRANK M. THOMAS

BY
Elmer J. Nealon
ATTORNEY.

3,078,559
Patented Feb. 26, 1963

3,078,559
METHOD FOR PREPARING SEMICONDUCTOR ELEMENTS

Frank M. Thomas, Lynnfield, Mass., assignor to Sylvania Electric Products Inc., a corporation of Delaware Filed Apr. 13, 1959, Ser. No. 806,012
6 Claims. (Cl. 29—413)

This invention relates to methods of preparing small elements of predetermined size and shape from substantially larger bodies of brittle crystalline material, and more particularly to the production of such small elements from ingots of crystalline semiconductor materials for use in electrical translating devices.

In the manufacture of semiconductor electrical translating devices such as diodes and transistors of well known types, the active semiconductor elements must generally be in the form of small thin chips or wafers commonly known as "dice." It is necessary to produce these dice from blocks or ingots which result from the steps involved in purification, controlled addition of doping impurities, and formation of the initial semiconductor material into single crystal structure. Many of the semiconductor materials suitable for translating devices such as, for example, germanium and silicon, are characterized by their extreme hardness and brittleness. For reasons which will be brought out in more detail below, these physical characteristics of the materials have made extremely difficult the problem of efficiently obtaining the required minute semiconductor elements from ingots of these materials.

Heretofore it has been the practice first to divide an ingot of appropriately prepared germanium or silicon into slabs or slices by repeatedly slicing parallel to one end of the ingot and subsequently to cut the slabs so produced into dice of the desired lateral dimensions. The slicing is generally done with a rotating saw or cutting wheel charged with diamond particles. Each slab of semiconductor is then secured to a supporting plate and subjected to various processes such as grinding, polishing, etching, or plating prior to being subdivided into dice.

One method of dicing has involved suitably mounting the slab on a backing plate of material readily cut by sawing, passing the slab through a gang of saws carefully set to barely cut through the slab and into the backing plate, passing the slab and backing plate through the gang of saws again after rotating 90°, and then detaching the individual dice from their mounting. Alternatively, the dicing has been accomplished by scribing the surface of the slab with a pointed tool in order to produce intersecting sets of grooves defining the edge boundaries of the dice and then breaking the slab along the grooves. This latter technique, which is well known in the art, is generally considered more suitable for use on relatively thin slabs of material. After reduction of the slabs to individual dice, it is generally necessary to subject the dice to further processing such as cleaning, etching, rinsing and drying steps before they are ready for incorporation into electrical translating devices.

Recently semiconductor materials and devices have been improved to provide better frequency response as well as other improved characteristics. This improvement has involved a reduction of the design thickness of the germanium or silicon dice in many types of translators to, for example, .002 to .006 inch. Earlier in the development of the semiconductor translator art, dice were quite commonly as thick as .015 to .020 inch.

The trend to thinner dice for specific applications has made even more pronounced the inefficiencies in the above-described technique for reducing the semiconductor ingot to dice. The abrasive diamond saws suitable for use in the slicing process are typically about .015 inch thick. Thus, in slicing to obtain dice having a thickness of .020 inch, it is readily appreciated that slightly over 40% of the usable portion of the ingot is reduced to sawdust in the slabbing operation alone. In preparing semiconductor material of only .002 to .006 inch thickness this waste is compounded since the slabs cannot be sliced to the desired ultimate thickness. Attempts to slice thinner than .008 to .012 inch frequently result in completely shattering the slabs along random lines because of the slight vibration of the saw and the extreme brittleness of the semiconductor. Accordingly it has been found desirable, for example, to saw slabs no thinner than about .008 inch, mount the slabs on blocks by means of a suitable cement, grind the slabs to a thickness of about .006 inch, remove the slabs from the block, and then chemically etch the slabs to the desired thickness. Alternatively, sometimes it may be more economical to eliminate grinding and rely completely on chemical etching to reduce the thickness of the slabs. The slabs are then subdivided into dice, usually by the scribing technque, and, if necessary, are subjected to further etching to obtain the thickness ultimately desired. It is thus evident that for each slab processed to produce dice .004 inch thick, .023 to .027 inch, or about 85% of the ingot length, may be lost as saw dust or in the grinding or etching steps. There is also loss of usable material resulting from breakage of the thin slabs during repeated handling. Unwanted strains caused by scribing thin slabs also contribute to breakage. Although much of the semiconductor material lost in cutting and breakage can be salvaged, substantial cost is necessarily involved in the reprocessing.

In its broadest aspect, it is therefore an object of the invention to provide an improved method for subdividing a mass or body of brittle crystalline material.

It is a further object of the invention to provide for better utilization of semiconductor material in the manufacture of semiconductor translating devices.

A still further object of the invention is to provide an improved method of preparing semiconductor dice.

Briefly, the method of the invention includes providing intersecting sets of grooves in a plane surface of a block or ingot of the brittle semiconductor material, positioning an adhesive medium adhering to the grooved surface and a rigid back-up or supporting plate reinforcing the adhesive medium, and then cutting through the ingot in a plane parallel and close to said surface. The adhesive medium is thus separated from the ingot with a thin slab of the semiconductor adherent thereto. Finally, the semiconductor material is removed from the adhesive medium in the form of dice of dimensions determined by the spacing and arrangement of the grooves provided in the first surface of the ingot. These dice are then readily etched or otherwise processed by techniques well known in the art preliminary to their incorporation in electrical translating devices.

In its broadest aspect, the invention contemplates cutting the grooves in the end surface of the ingot to a depth ranging from less to greater than the thickness of the slab to be severed from the ingot. However, as will be pointed out in more detail hereinafter, certain of the important features of the invention are employed to best advantage if the depth of the grooves is slightly less than the thickness of the slab.

In one embodiment of the invention, the adhesive medium consists of a layer of adhesive or cement serving to attach the rigid back-up plate to the grooved surface of the ingot. The back-up plate is thus separated from the ingot with a thin slab of the semiconductor material adhering to the plate, grooved side toward the plate.

In another embodiment of the invention, the adhesive medium consists of a layer of adhesive material and a supporting film for the adhesive material. The back-up plate is maintained in position against the film during the cutting step thus reinforcing the adhesive medium without becoming adherent thereto. The supporting film is thus separated from the ingot with a thin slab of the semiconductor material adhering thereto.

The method of the invention including objects and features not specifically mentioned above may be best understood by reference to the following description taken with the accompanying drawings, wherein.

Figures 1, 2:
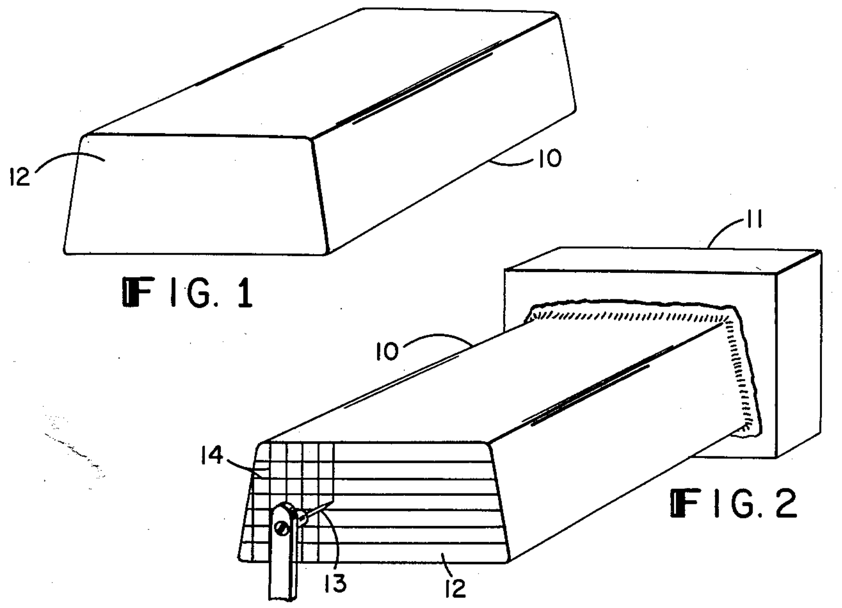
FIG. 1 shows a section of an ingot of single crystal germanium prepared for subdivision into dice by the method of the invention.
FIG. 2 shows the ingot mounted at one end on a supporting plate and having grooves provided in the surface of the other end.

Referring more specifically to the drawings, there is shown in FIG. 1 a block 10 of semiconductor material. The block or ingot may be a section of a larger block or ingot of single crystal semiconductor suitably doped with a conductivity type imparting impurity and prepared according to known techniques in order to afford particular electrical characteristics in the semiconductor material. Generally, it is desirable to divide the large ingot of semiconductor as grown into smaller individual ingots 10 to provide for easier handling and to permit several pieces of the large ingot to be processed at the same time. Each block or ingot 10 is separated from the larger ingot in such a way as to present smooth planar surfaces as at face 12.

The block or section of semiconductor material 10 is mounted, as shown in FIG. 2, on a solid metal holding plate 11. The semiconductor block is attached to the plate by means of a thermoplastic cement. In order to eliminate any work-strained metal at the exposed surface 12, the block is suitably etched and cleaned employing known techniques. The face 12 is then scribed or scored with a pointed tool 13 of carboloy to define the edge boundaries 14 in the final semiconductor wafers or dice. The scribing tool is drawn across the face so as to cut the intersecting sets of grooves to a depth of about one thousandth of an inch.

Figure 3:
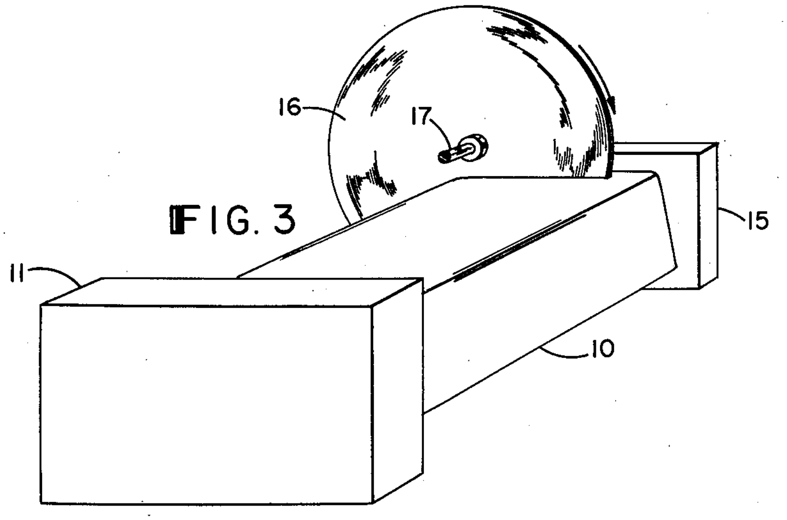
FIG. 3 shows the ingot being cut transversely in a plane close to the grooved surface of the ingot.

A back-up or supporting plate 15 is mounted against the grooved surface 12 of the semiconductor block 10 as shown in FIG. 3. The plate 15 is a rigid supporting block of either metal or ceramic. It is attached to the face of the semiconductor block by a layer of suitable adhesive such as, for example, paraffin. Paraffin is a particularly suitable adhesive for this purpose because it is easy to apply in molten form or in solution and to subsequently remove, and it holds well during the process of subdividing the semiconductor block. The paraffin forms a layer about one thousandth of an inch thick between the back-up plate and the face of the semiconductor block thus providing for some yield between semiconductor and plate.

The holding plate 11 is rigidly clamped in the slicing apparatus, not shown. The saw or cutting wheel 16 which is charged about its periphery with diamond particles is rotated by a suitably driven shaft 17. The saw blade is carefully oriented with respect to the scored planar surface 12 of the semiconductor block. It is positioned back from the face a distance equal to the desired thickness of the dice. The blade is arranged so as to cut parallel to the face, thus providing dice of uniform thickness from all portions of the slab cut from the face of the block. The cutting wheel is rotated at high speed and is moved slowly as it slices into the semiconductor block as shown in FIG. 3.

Figure 4:
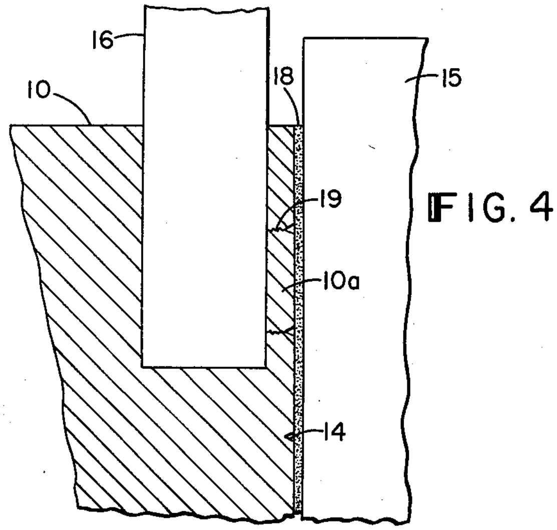
FIG. 4 is an enlarged view, partly in section, showing the action of the saw or cutting wheel passing through the ingot in one embodiment of the invention.

FIG. 4 shows a detail of the semiconductor block in cross-section as the saw cuts into it. The back-up plate 15 is attached to the block 10 by the layer of adhesive 18. As the saw cuts into the block of semiconductor, normal slight vibration of the saw blade introduces stresses in the slab of semiconductor lying between the saw and the back-up plate. As discussed hereinabove, it is this vibration which heretofore has commonly caused objectionable, uncontrolled shattering along random lines whenever slicing of slabs less than about .010 inch thick has been attempted. With the grooves 14 scribed in the face of the block, however, the stresses introduced by saw vibration are concentrated between the bottoms of the grooves and the saw blade because of the reduced cross-section of the slab in these zones. Fractures thus occur along the grooves 14 and form the edge boundaries 19 of each individual die 10*a*. During this operation the back-up plate 15 serves an essential function by providing rigidity to the slab being divided into dice and thereby limiting the extent of saw vibration. Premature fracture of the slab along lines other than the scribed grooves is thus prevented. At the same time, the layer of paraffin 18, which is substantially inelastic, permits sufficient permanent yielding to enable the individual dice to break loose from the slab without binding the saw or transmitting any stress to other portions of the slab.

Upon completion of the slicing operation, the dice are removed from the back-up plate 15 by melting the paraffin or dissolving it in a suitable solvent. The dice are then chemically etched to remove the work-strained layer of metal at the surface resulting from sawing. The dice are also suitably cleaned or otherwise subjected to any of various treatments known in the art in preparation for incorporating the dice into electrical devices.

In a second embodiment of the invention a block or ingot of semiconductor material is prepared, mounted on a metal holding plate, and scribed or scored with a pointed tool as described hereinabove in connection with the first embodiment. A thin layer or supporting film of material such as, for example, a metal foil, plastic film, or cellophane having on one surface a layer of an adhesive material which adheres upon contact is placed with the adhesive material against the grooved surface of the ingot. The holding plate is then rigidly clamped in the slicing apparatus and a back-up or supporting plate is positioned against the film and rigidly clamped with respect to the slicing apparatus. The ingot is then sliced with a rotating cutting wheel as described in the discussion of the previous embodiment.

Figure 5:
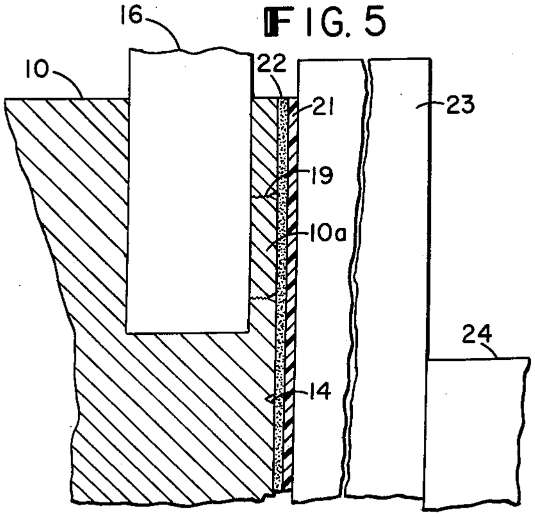
FIG. 5 is an enlarged view, partly in section, showing the action of the saw or cutting wheel passing through the ingot in a second embodiment of the invention.

A detail of the semiconductor ingot as the saw cuts into it is shown in FIG. 5. The supporting film 21 and the layer of adhesive material 22 are held in position against the scribed face of the ingot 10 by the back-up plate 23. A tail stock arrangement, only a portion 24 of which is shown in the drawing, maintains the back-up plate in position relative to the ingot. As the saw 16 cuts into the block of semiconductor, the stresses introduced by saw vibration cause fractures to occur along the grooves 14 and form the edge boundaries 19 of each individual die 10*a*. The back-up plate serves the essential function of reinforcing the adhesive medium to provide rigidity to the semiconductor slab being divided into dice, thus limiting the extent of saw vibration. Premature fracture of the slab along lines other than the scribed grooves is thus prevented. At the same time, the adhesive medium permits sufficient yielding to enable the dice to break loose from the slab without transmitting any stress to other portions of the slab. After the slicing operation has been completed, the dice are removed from the adhesive medium and suitably etched and cleaned in preparation for incorporation into electrical devices.

Figure 6:
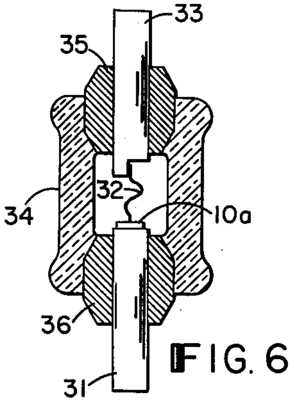
FIG. 6 shows a semiconductor diode incorporating a semiconductor die produced by the method of the invention.

One type of electrical translating device into which a semiconductor die prepared according to the method of the invention may be incorporated is shown in FIG. 6. A semiconductor die 10*a* is soldered to a pin 31. A tungsten whisker 32 appropriately formed and pointed is welded to another pin 33. A capsule consisting of a glass cylinder 34 and two sleeves 35 and 36 of a material forming a hermetic seal with the glass cylinder is separately fabricated. The pin 31 on which the semiconductor die 10*a* is mounted is soldered in position in the sleeve 36. Pin 33 with the tungsten whisker 32 mounted thereon is positioned in the other sleeve 35 so as to provide proper electrical rectifying contact between the semiconductor die and the whisker. The pin is then soldered to the sleeve. Electrical translating devices of this type are well known in the semiconductor diode art and have been available commercially for a number of years. The device is shown here only to illustrate a use to which dice prepared by the method of the invention may be put.

Obviously individuals skilled in the art will find many possible variations and modifications of the invention as disclosed without departing from the principles involved. For example, the rotating saw may be replaced by a reciprocating cutting tool or possibly by an ultrasonic cutting device. The method of introducing grooves into the face of the semiconductor block may also be varied. Specifically, a series of intersecting saw cuts may be used instead of grooves produced by scribing techniques. The sawing technique is useful if it is desired to cut the grooves deep, particularly if they are to be deeper than the thickness of the dice. However, it has been found generally unnecessary to saw deep grooves in the semiconductor block with the consequent loss of material. Instead, it is normally preferable merely to scribe or otherwise form light, shallow grooves in the surface. The stress introduced by the slight vibration of the slicing saw then concentrates at the grooves and thus fractures the dice at their edge boundaries.

By following the principles of the invention it is possible to slice dice as thin as desired and thus eliminate the loss of expensive semiconductor material which occurs upon grinding and etching relatively thick slabs and then further etching individual dice to the desired thickness. The elimination of all handling and processing of the semiconductor in slab form, particularly after the slabs have been reduced to size, eliminates breakage incident to such handling and processing. In addition to the increased utilization of material, the invention also provides for further efficiencies by eliminating or reducing processing steps such as grinding, etching, and breaking-up scribed slabs.

What is claimed is:

1. The method of forming small elements of predetermined size and shape from a block of semiconductor material including the steps of cutting grooves defining the edge boundaries of the elements in one surface of the block, positioning an adhesive medium and a rigid plate against said surface with said adhesive medium intermediate the surface and the plate, cutting through the block at a predetermined distance from said surface, said predetermined distance being greater than the depth of the grooves, to permit the individual elements to be separated from the block and to be formed by fracture along the grooves, and then separating the individual elements from the adhesive medium.

2. The method of forming semiconductor dice of predetermined size and shape from a block of semiconductor material including the steps of scribing grooves defining the edge boundaries of the dice in one surface of the block, placing an adhesive medium in adherent contact with the one surface and a rigid plate reinforcing the adhesive medium, cutting through the block at a distance from said one surface equal to the predetermined thickness of the dice to permit the dice to be separated from the block and to form by fracture along the scribed grooves, and then separating the dice from the adhesive medium.

3. The method of producing semiconductor dice of predetermined size and shape from a block of semiconductor material including the steps of cutting grooves in one surface of said block to define the edge boundaries of the dice, positioning a rigid plate in supporting relation to said surface, cutting said block in a plane parallel and closely adjacent to said one surface at a distance from said one surface, said distance being greater than the depth of the grooves, to induce fracture of the semiconductor material along the grooves and to separate the dice so formed from the block, and thereafter separating said dice constituting said slab from each other.

4. The method of forming small elements of predetermined size and shape from a block of semiconductor material including the steps of cutting grooves defining the edge boundaries of the elements in one surface of the block, attaching a rigid plate to said surface, cutting through the block at a predetermined distance from said surface, said predetermined distance being greater than the depth of the grooves, to induce fracture of the semiconductor material along the grooves and to separate said rigid plate from said block with the individual elements so formed attached thereto, and then removing the individual elements from said plate.

5. The method of forming dice of predetermined size and shape from a block of semiconductor material including the steps of scribing grooves defining the edge boundaries of the dice in one surface of the block, attaching a rigid plate to said surface by means of a yielding adhesive, cutting through the block at a distance from said surface equal to the predetermined thickness of the dice to induce fracture of the semiconductor material along the scribed grooves and to separate the dice so formed from the block, and then removing the dice from the plate.

6. The method of forming dice of predetermined size and shape from a block of semiconductor material including the steps of scribing grooves defining the edge boundaries of the dice in one surface of the block, placing an adhesive medium having a supporting film in adherent contact with the one surface, maintaining a rigid back-up plate in contact with said supporting film and cutting through the block at a distance from said surface equal to the predetermined thickness of the dice to induce fracture of the semiconductor material along the scribed grooves and to separate the dice so formed from the block, and then removing the dice from the adhesive medium.

References Cited in the file of this patent

UNITED STATES PATENTS

| | | |
|---|---|---|
| 676,799 | McLoughlin | June 18, 1901 |
| 744,245 | Semmer | Nov. 17, 1903 |
| 1,357,739 | Steenstrup | Nov. 2, 1920 |
| 1,731,820 | Lewis | Oct. 15, 1929 |
| 2,415,841 | Ohl | Feb. 18, 1947 |
| 2,423,810 | Goulding | July 8, 1947 |
| 2,441,590 | Ohl | May 18, 1948 |
| 2,530,110 | Woodyard | Nov. 14, 1950 |
| 2,736,847 | Barnes | Feb. 28, 1956 |
| 2,762,954 | Leifer | Sept. 11, 1956 |
| 2,865,082 | Gates | Dec. 23, 1958 |